(12) United States Patent  
Kajihara et al.

(10) Patent No.: US 11,025,140 B2
(45) Date of Patent: Jun. 1, 2021

(54) ROTARY ELECTRIC MACHINE HAVING HEAT SINK FOR SEMICONDUCTOR DEVICE OF CONTROLLER

(71) Applicant: Mitsubishi Electric Corporation, Tokyo (JP)

(72) Inventors: Takanobu Kajihara, Tokyo (JP); Katsuhiko Omae, Tokyo (JP); Shunsuke Fushie, Tokyo (JP); Tokiyoshi Tanigawa, Tokyo (JP); Hiroyuki Miyanishi, Tokyo (JP); Atsuki Fujita, Tokyo (JP); Tomohiro Inoue, Tokyo (JP); Yuki Okabe, Tokyo (JP); Junya Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/461,886

(22) PCT Filed: Nov. 22, 2016

(86) PCT No.: PCT/JP2016/084652  
§ 371 (c)(1),  
(2) Date: May 17, 2019

(87) PCT Pub. No.: WO2018/096596  
PCT Pub. Date: May 31, 2018

(65) Prior Publication Data  
US 2019/0372432 A1 Dec. 5, 2019

(51) Int. Cl.  
*H02K 9/22* (2006.01)  
*H02K 11/33* (2016.01)  
(Continued)

(52) U.S. Cl.  
CPC .............. *H02K 9/22* (2013.01); *H02K 7/116* (2013.01); *H02K 11/33* (2016.01); *B62D 5/04* (2013.01);  
(Continued)

(58) Field of Classification Search  
CPC . B62D 5/04; H02K 7/116; H02K 9/00; H02K 9/02; H02K 9/04; H02K 9/22;  
(Continued)

(56) References Cited

U.S. PATENT DOCUMENTS

2006/0177967 A1 8/2006 Muto et al.  
2009/0215230 A1 8/2009 Muto et al.  
(Continued)

FOREIGN PATENT DOCUMENTS

DE 102016107580 A1 10/2016  
JP 2006-222121 A 8/2006  
(Continued)

OTHER PUBLICATIONS

International Search Report for PCT/JP2016/084652 dated Feb. 28, 2017 [PCT/ISA/210].  
(Continued)

*Primary Examiner* — Tulsidas C Patel  
*Assistant Examiner* — Rashad H Johnson  
(74) *Attorney, Agent, or Firm* — Sughrue Mion, PLLC; Richard C. Turner

(57) ABSTRACT

In a rotary electric machine in which a controller and a heat sink are arranged in an extending direction of an output shaft of a motor, in order to provide a rotary electric machine which secures a heat rejection performance and an insulation performance of a semiconductor device to be mounted to the controller and is downsized as a whole, the controller includes a semiconductor device having a drive circuit provided so as to correspond to a stator winding of the  
(Continued)

motor, and the semiconductor device has a main face held in close contact with the heat sink. On a close contact face between the semiconductor device and the heat sink, a drive circuit is formed so as to extend along an outer edge portion of the heat sink to increase a cooling area.

13 Claims, 11 Drawing Sheets

(51) Int. Cl.
*H02K 7/116* (2006.01)
*B62D 5/04* (2006.01)
*H02K 11/00* (2016.01)
*H02K 9/02* (2006.01)
*H02K 9/00* (2006.01)
*H02K 9/04* (2006.01)
*H02K 9/24* (2006.01)

(52) U.S. Cl.
CPC ............... *H02K 9/00* (2013.01); *H02K 9/02* (2013.01); *H02K 9/04* (2013.01); *H02K 9/24* (2013.01); *H02K 11/00* (2013.01); *H02K 2211/03* (2013.01)

(58) Field of Classification Search
CPC ...... H02K 9/24; H02K 11/00; H02K 11/0094; H02K 11/30; H02K 11/33; H02K 2211/03
USPC .................................. 310/52, 55, 64, 71, 89
See application file for complete search history.

(56) References Cited

U.S. PATENT DOCUMENTS

| | | | | |
|---|---|---|---|---|
| 2012/0229005 A1* | 9/2012 | Tominaga | ............... | H02K 11/38 310/68 B |
| 2013/0088128 A1 | 4/2013 | Nakano et al. | | |
| 2013/0334906 A1 | 12/2013 | Sonoda et al. | | |
| 2014/0151146 A1 | 6/2014 | Tanaka et al. | | |
| 2014/0326530 A1 | 11/2014 | Asao et al. | | |
| 2015/0216083 A1 | 7/2015 | Kanazawa et al. | | |
| 2015/0236570 A1* | 8/2015 | Hayashi | ................ | H02K 11/33 310/45 |
| 2015/0333586 A1 | 11/2015 | Hirotani et al. | | |
| 2015/0333600 A1* | 11/2015 | Nakano | ................ | H02K 11/33 310/71 |
| 2016/0036299 A1 | 2/2016 | Hayashi | | |
| 2016/0294235 A1* | 10/2016 | Takizawa | ............... | H02K 1/276 |
| 2017/0085138 A1* | 3/2017 | Nakano | ................ | H02K 1/14 |
| 2018/0233992 A1* | 8/2018 | Takeuchi | ............... | H02K 11/33 |
| 2019/0356259 A1* | 11/2019 | Oiwa | ................ | B62D 5/0481 |

FOREIGN PATENT DOCUMENTS

| | | |
|---|---|---|
| JP | 2009-200338 A | 9/2009 |
| JP | 2010-092983 A | 4/2010 |
| JP | 2010-136567 A | 6/2010 |
| JP | 2013-258303 A | 12/2013 |
| JP | 5365872 B2 | 12/2013 |
| JP | 5518108 B2 | 6/2014 |
| WO | 2013/111365 A1 | 8/2013 |
| WO | 2015/170383 A1 | 11/2015 |
| WO | 2016/166834 A1 | 10/2016 |
| WO | 2016/166835 A1 | 10/2016 |

OTHER PUBLICATIONS

Communication dated Jan. 8, 2020, from the European Patent Office in counterpart European Application No. 16922284.1.
Communication dated May 12, 2020, from the European Patent Office in application No. 16922284.1.
Communication dated Aug. 4, 2020, from the Japanese Patent Office in application No. 2018-552304.
Communication dated Jun. 18, 2020 from the Intellectual Property India in Indian Application No. 201947017681.

* cited by examiner

ROTARY ELECTRIC MACHINE HAVING HEAT SINK FOR SEMICONDUCTOR DEVICE OF CONTROLLER

Cross Reference To Related Applications

This application is a National Stage of International Application No. PCT/JP2016/084652 filed Nov. 22, 2016.

TECHNICAL FIELD

The present invention relates to a rotary electric machine, and more particularly, to a controller-integrated rotary electric machine.

BACKGROUND ART

In a related-art rotary electric machine which is used for an electric power steering apparatus or an integrated starter generator, a semiconductor device including a power semiconductor element mounted thereto is used, and a controller and a motor are integrated with each other.

For example, the electric power steering apparatus as the related-art rotary electric machine mainly includes a motor, a controller, a coupling device, and sensors. The motor is configured to assist a driver's steering effort. The controller is configured to control the motor. The coupling device for coupling to a speed reduction mechanism, which is configured to reduce a speed of output of the motor and transmit the output to a steering shaft. The sensors are configured to detect, for example, the driver's steering effort.

As one of meaes for downsizing of the electric power steering apparatus, there has already been provided an electric power steering apparatus including a motor and a controller which are integrated with each other. Moreover, a semiconductor module (semiconductor device) mounted to the controller has a configuration in which an insulating sheet for insulation from a heat sink is interposed between the semiconductor module and the heat sink (see, for example, Patent Literature 1).

Moreover, for example, a heat rejection face, which is held in contact with a heat sink, of a power module (semiconductor device) mounted to a related-art electric power steering apparatus has a substantially fan shape so as to increase a heat rejection area in order to improve heat rejection performance (see, for example, Patent Literature 2).

CITATION LIST

Patent Literature

[PTL 1] JP 5365872 B2
[PTL 2] JP 5518108 B2

SUMMARY OF INVENTION

Technical Problem

The related-art rotary electric machine disclosed in Patent Literature 1 described above has a configuration in which the motor and the controller are arranged in an extending direction of an output shaft of the motor, and are integrated with each other. In the related-art electric power steering apparatus, the power module which is a main part forming an inverter circuit has such a configuration that an extending direction of a flat face thereof is arranged so as to be substantially parallel to an output shaft direction of the motor (hereinafter, such arrangement is referred to as "vertical arrangement"). Thus, there has been a problem in that a shaft length of the electric power steering apparatus increases. Further, the heat sink is also arranged in the vertical arrangement, and hence there has been a problem in that heat rejection performance is poor.

Moreover, in the related-art electric power steering apparatus described above, the semiconductor device is arranged in the vertical arrangement, and a stator winding of the motor is connected to the semiconductor device at a top end of the semiconductor device which is present at a position far from the motor. Thus, there has been a problem in that assembly is complicated.

Further, the insulating sheet is interposed between the semiconductor module and the heat sink. Thus, in consideration of cost in view of productivity and processability of the insulating sheet, the insulating sheet is formed so as to have a rectangular shape. The shape of the semiconductor device is also limited to the rectangular shape so as to be in conformity with the shape of the insulating sheet. Thus, the degree of freedom in design is small, and hence there has been a problem in that downsizing of the electric power steering apparatus is hindered.

Meanwhile, in the power module mounted to the related-art electric power steering apparatus disclosed in Patent Literature 2 described above, a control terminal interferes with another adjacent terminal when the control terminals are each elongated in the flat face direction. Moreover, a distance between the control terminals is reduced, and hence there has been a problem in that insulation performance is poor.

The present invention has been made to solve the problems described above, and has an object to provide a rotary electric machine which secures excellent heat rejection performance and insulation performance of a semiconductor device mounted to a controller and is downsized.

Solution to Problem

According to one embodiment of the present invention, there is provided a rotary electric machine, comprising a controller and a heat sink which are arranged in an extending direction of an output shaft of a motor, wherein the controller includes a semiconductor device having a drive circuit provided so as to correspond to a stator winding of the motor, and the semiconductor device has a main face held in close contact with the heat sink, and wherein, on a close contact face between the semiconductor device and the heat sink, the drive circuit is formed so as to extend along an outer edge portion of the heat sink to increase a cooling area.

Advantageous Effects of Invention

In the rotary electric machine according to one embodiment of the present invention, the controller and the heat sink are arranged in the extending direction of the output shaft of the motor. The semiconductor device included in the controller has the main face held in close contact with the heat sink. On the close contact face between the semiconductor device and the heat sink, the drive circuit is formed so as to extend along the outer edge portion of the heat sink to increase a cooling area. Thus, the heat rejection performance from the semiconductor device to the heat sink and the insulation performance are excellent. Moreover, the shaft length of the output shaft of the motor can be reduced. Thus, effects of simplifying assembly and achieving downsizing can be attained.

DESCRIPTION OF EMBODIMENTS

First Embodiment

Now, with reference to the accompanying drawings described above, description is made of an electric power steering apparatus as an example of a rotary electric machine according to a first embodiment of the present invention.

Figure 1:
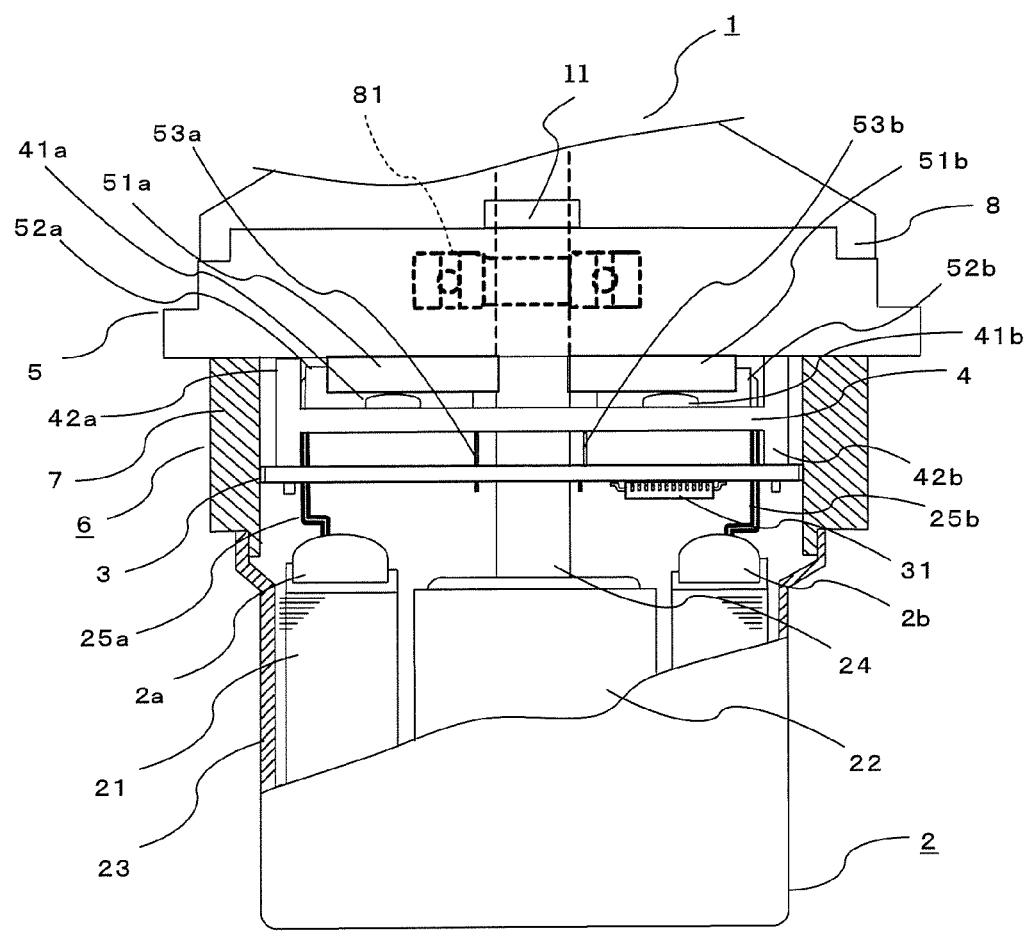
FIG. 1 is a partial sectional view for illustrating a rotary electric machine according to a first embodiment of the present invention.

In FIG. 1, a rotary electric machine 1 mainly includes a motor 2, a heat sink 5, a controller 6, and a gear part 8. The motor 2 is configured to assist a driver's steering effort. The heat sink 5 is configured to cool semiconductor devices described later. The controller 6 is configured to control the motor 2. The gear part 8 is configured to reduce a speed of output of the motor 2 and transmit the output to a steering shaft (not shown). The motor 2, the controller 6, the heat sink 5, and the gear part 8 are sequentially arranged in an extending direction of the output shaft of the motor 2 (hereinafter referred to as "axis direction"), and are integrated with each other.

The motor 2 forms a two-layer three-phase rotary electric machine, and includes a stator 21, a rotor 22, an output shaft 24, and a yoke 23. The stator 21 is formed of a layered iron core around which a first stator winding 2a delta-connected in three phases and a second stator winding 2b delta-connected in three phases are wound. The rotor 22 is inserted into a center space of the stator 21. The output shaft 24 is provided at a center portion of the rotor 22. The yoke 23 is configured to accommodate therein the stator 21, the rotor 22, and the output shaft 24. The first stator winding 2a and the second stator winding 2b form two stator windings which are independent from each other. The first stator winding 2a and a first inverter circuit 511a described later form a first control system for the motor 2. The second stator winding 2b and a second inverter circuit 511b described later form a second control system for the motor 2.

The controller 6 includes a control board 3, a first semiconductor device 51a, a second semiconductor device 51b, a relay member 4, and a housing 7. The control board 3 includes a microcomputer (hereinafter referred to as "CPU") 31 mounted thereto. The first semiconductor device 51a and the second semiconductor device 51b are two independent semiconductor devices which are held in abutment against the heat sink 2. The relay member 4 is interposed between the heat sink 5 and the control board 3, and is configured to allow the heat sink 5 and the control board to be opposed to each other through a predetermined gap therebetween. The housing 7 is configured to accommodate therein the control board 3, the first semiconductor device 51a and the second semiconductor device 51b (hereinafter collectively denoted by the reference symbol 51 in some parts), and the relay member 4.

As described later, the first semiconductor device 51a and the second semiconductor device 51b described above are each formed so as to include at least one group of drive circuit portions. The drive circuit portions have the same shape or different shapes including, for example, a rectangular shape, a polygonal shape, or a curved shape so as to extend along an outer edge portion of the heat sink 5. The first semiconductor device 51a and the second semiconductor device 51b each have a front face and a back face. The front face forms a main face and serves as a mounting face. The back face serves as a heat rejection face. The front face and the back face are arranged so as to be perpendicular to the axis direction of the motor 2. The main faces of the first semiconductor device 51a and the second semiconductor device 51b are each formed so as to have an area larger than those of a side face of the outer edge portion, a side face of an inner edge portion, and a side face of a side edge portion connecting the outer edge portion and the inner edge portion to each other.

Winding ends 25a and 25b of the first stator winding 2a and the second stator winding 2b extend in the axis direction of the motor 2 toward the first semiconductor device 51a and the second semiconductor device 51b. The winding ends 25a and 25b penetrate through the control board 3 and are connected to winding control terminals 52a and 52b (hereinafter collectively denoted by the reference symbol 52 in some parts) of the first semiconductor device 51a and the second semiconductor device 51b, respectively, using the relay member 4 as a guide. Moreover, the use of the relay member 4 as a guide may contribute also to a countermeae for vibration of the windings.

The winding ends 25a and 25b of the first stator winding 2a and the second stator winding 2b may pass along a peripheral edge portion of the control board 3, without penetrating through the control board 3, to be connected to the control terminals 52a and 52b of the first semiconductor device 51a and the second semiconductor device 51b using the relay member 4 as a guide.

Moreover, the positions at which the control terminals 52a and 52b of the first semiconductor device 51a and the second semiconductor device 51b are connected to the winding ends 25a and 25b of the first stator winding 2a and the second stator winding 2b, respectively, are not limited to the positions between the relay member 4 and the first semiconductor device 51a and the second semiconductor device 51b illustrated in FIG. 1, and may also be a space defined between the control board 3 and the relay member 4, or spaces defined between the first stator winding 2a and the control board 3 and between the second stator winding 2b and the control board 3. Through extension of the control terminals 52a and 52b and the winding ends 25a and 25b to the positions of those spaces, connection thereof can be achieved. Thus, the connection positions can be freely selected in consideration of ease of assembly of the controller-integrated rotary electric machine.

The CPU 31 in the controller 6 is configured to calculate a control amount corresponding to a current to be supplied to the motor 2 and output a control signal based on a calculation result. The control signal output from the CPU 31 is transmitted to the first semiconductor device 51a and the second semiconductor device 51b through a first control terminal (connection terminal) 53a and a second control terminal (connection terminal) 53b. Moreover, as described later, for example, a terminal voltage and a terminal current of the motor 2 are transmitted from the first semiconductor device 51a and the second semiconductor device 51b to the CPU 31 through the control terminals 53a and 53b (hereinafter collectively denoted by the reference symbol 53 in some parts), and are monitored in the CPU 31.

The heat sink 5 is fitted to the output shaft of the motor 2, and has a flat face extending in a direction perpendicular to the axis direction of the motor 2. The gear part 8 configured to transmit an assist torque from the motor 2 to a steering wheel or a tire is held in close contact with and fixed to one end face side of the heat sink 5 in the axis direction (end face on an upper side in FIG. 1). The main faces of the first semiconductor device 51a and the second semiconductor device 51b are held in close contact with and fixed to the flat face of another end face of the heat sink 5 in the axis direction (end face on a lower side in FIG. 1). The main faces of the semiconductor devices 51a and 51b correspond to faces having the largest face area in outer faces of the semiconductor devices 51a and 51b and extending in a substantially planar form. That is, the main faces each correspond to a front face, which is other than side faces and is a mounting face, or a back face, which is a heat rejection face.

Heat generated by operations of the first semiconductor device 51a and the second semiconductor device 51b is rejected through the heat sink 5, and is also transmitted to the gear part 8 through the heat sink 5 and rejected therefrom. Therefore, it is desired that the heat sink 5 be made of a material having excellent heat rejection performance, such as aluminum or copper. A bearing 81 is fixed at a center portion of the heat sink 5. The bearing 81 serves to turnably support the output shaft 24 of the motor 2 and position an axis center of the output shaft 24.

In order to allow the first semiconductor device 51a and the second semiconductor device 51b to be held in close contact with the heat sink 5, the relay member 4 has a first projection portion 41a and a second projection portion 41b which are provided so as to correspond to the first semiconductor device 51a and the second semiconductor device 51b, respectively. The first projection portion 41a and the second projection portion 41b (hereinafter collectively denoted by the reference symbol 41 in some parts) press the first semiconductor device 51a and the second semiconductor device 51b, respectively, toward the heat sink 5, to thereby allow the first semiconductor device 51a and the second semiconductor device 51b to be held in close contact with the heat sink 5.

As illustrated in FIG. 1, the controller 6 is arranged between the motor 2 and the heat sink 5 in the axis direction of the motor 2, and the output shaft 24 of the motor 2 penetrates through a center of the controller 6. The controller-integrated rotary electric machine 1 having such configuration is assembled in the following order. First, the relay member 4, the first semiconductor device 51a, and the second semiconductor device 51b are stacked. The control board 3 is further stacked thereon, and the controller 6 is assembled. Then, the controller 6 is assembled to the motor 2 in the axis direction. After that, the housing 7 and the heat sink 5 are assembled. Finally, the gear part 8 is integrated.

Alternatively, as another order of assembly, the controller-integrated rotary electric machine 1 may be assembled as follows. First, the control board 3, the relay member 4, the first semiconductor device 51a, and the second semiconductor device 51b are sequentially stacked on the motor 2. Next, the housing 7 and the heat sink 5 are mounted. Finally, the gear part 8 is assembled. Further, when the housing 7 is divided into a plurality of sections, the controller-integrated rotary electric machine 1 may be assembled as follows. The first semiconductor device 51a and the second semiconductor device 51b are mounted on an upper part of the heat sink 5 (lower part of the heat sink 5 in FIG. 1). Next, the relay member 4 and the control board 3 are assembled to each other and then connected to the motor 2. After that, the housing 7 and the gear part 8 are assembled.

Next, description is made of arrangements and shapes of the first semiconductor device 51a and the second semiconductor device 51b including switching semiconductor elements and relay semiconductor elements, which are power elements causing generation of a large amount of heat.

Figure 2:
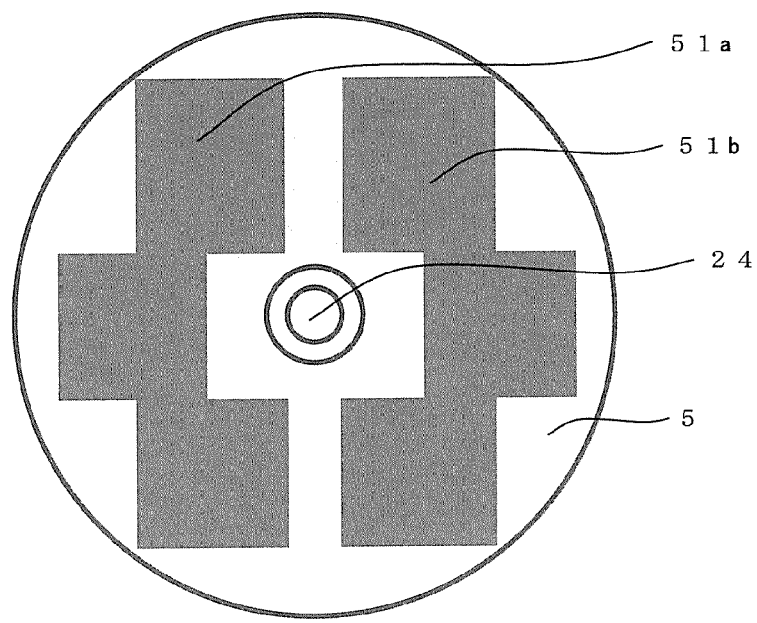
FIG. 2 is a plan view for illustrating an arrangement example (first) of a semiconductor device in a controller integrated with the rotary electric machine according to the first embodiment of the present invention.

As illustrated in FIG. 2, in the plan view of the inside of the controller for illustrating the arrangement of the semiconductor devices 51a and 51b, illustration is given of a state in which the first semiconductor device 51a and the second semiconductor device 51b are held in close contact with and fixed to the flat face of another end face (end face on the lower side in FIG. 1) of the heat sink 5.

In FIG. 2, the first semiconductor device 51a and the second semiconductor device 51b are mounted to the heat sink 5. In the first semiconductor device 51a and the second semiconductor device 51b, a heat generation amount becomes larger when a large current is caused to flow therethrough. Therefore, a large current cannot be caused to flow therethrough unless the heat rejection effect is improved. The entirety of the controller 6 is arranged on an upper part of the motor 2 in FIG. 1, and components forming the controller 6 are fixed integrally with the motor 2. Further, the heat sink 5 held in close contact with the semiconductor devices 51a and 51b, which each have a protruding shape combining three rectangles, is fixed to the housing 7 of the controller 6.

The first semiconductor device 51a and the second semiconductor device 51b are provided on substantially the entirety of the front face of the heat sink 5. The first semiconductor device 51a and the second semiconductor device 51b are arranged so as to sandwich the output shaft 24 from both sides, or are evenly arranged so as to round the output shaft 24. The first semiconductor device 51a and the second semiconductor device 51b each have a protruding shape combining three rectangles extending along an outer shape of the heat sink 5 so as to increase a contact area with respect to the heat sink 5.

Figure 3:
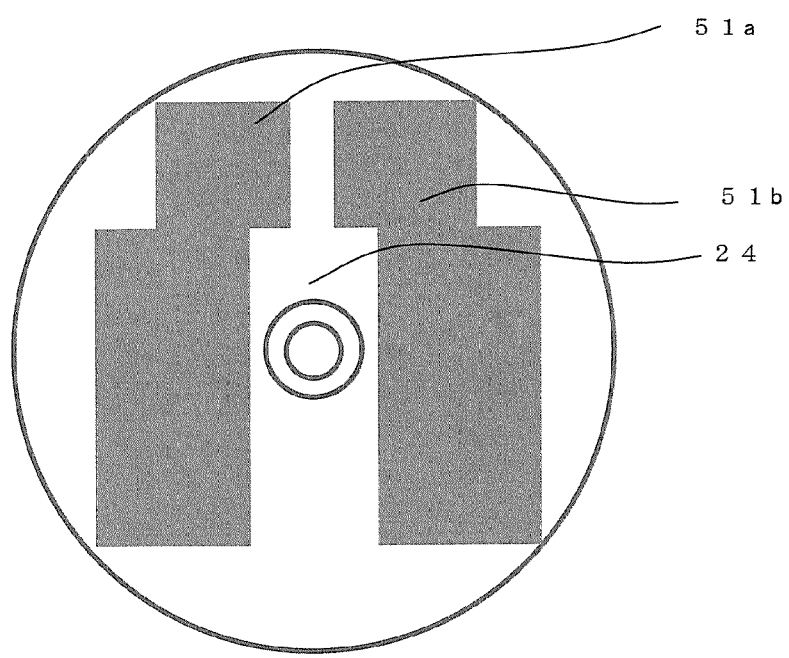
FIG. 3 is a plan view for illustrating an arrangement example (second) of the semiconductor device in the controller integrated with the rotary electric machine according to the first embodiment of the present invention.
Figure 4:
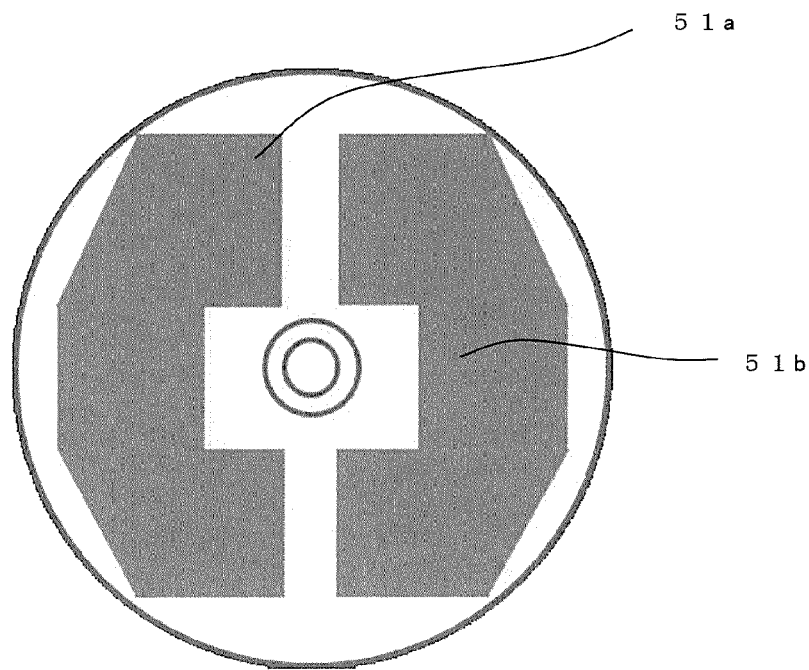
FIG. 4 is a plan view for illustrating an arrangement example (third) of the semiconductor device in the controller integrated with the rotary electric machine according to the first embodiment of the present invention.
Figure 5:
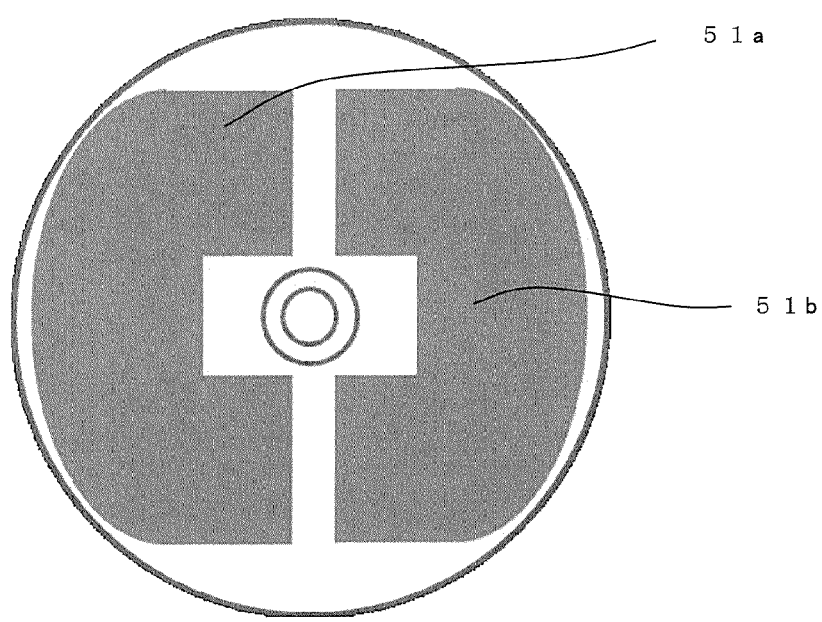
FIG. 5 is a plan view for illustrating an arrangement example (fourth) of the semiconductor device in the controller integrated with the rotary electric machine according to the first embodiment of the present invention.

As described above, the main faces of the first semiconductor device 51a and the second semiconductor device 51b, that is, the board faces each have a protruding shape so as to effectively obtain a cooling area. Moreover, in addition to the protruding shape, depending on the shape of the controller 6, the semiconductor devices have the same shape or different shapes combining shapes such as a rectangular shape, a polygonal shape, and a curved shape so as to extend along the outer edge portion of the controller 6 while avoiding the output shaft 24 as illustrated in FIG. 3, FIG. 4, and FIG. 5.

Figure 6:
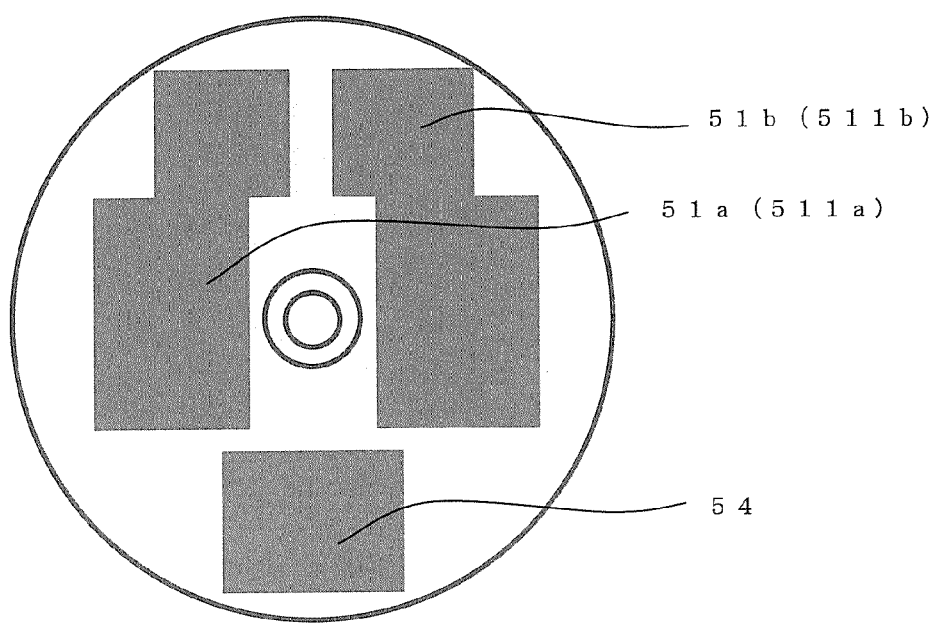
FIG. 6 is a plan view for illustrating an arrangement example (fifth) of the semiconductor device in the controller integrated with the rotary electric machine according to the first embodiment of the present invention.

Moreover, as illustrated in FIG. 6, in consideration of mounting areas for other components and a module mounting space, three semiconductor devices, which have different shapes and include two inverter circuits and one relay 54, may be intensively provided.

Figure 7:
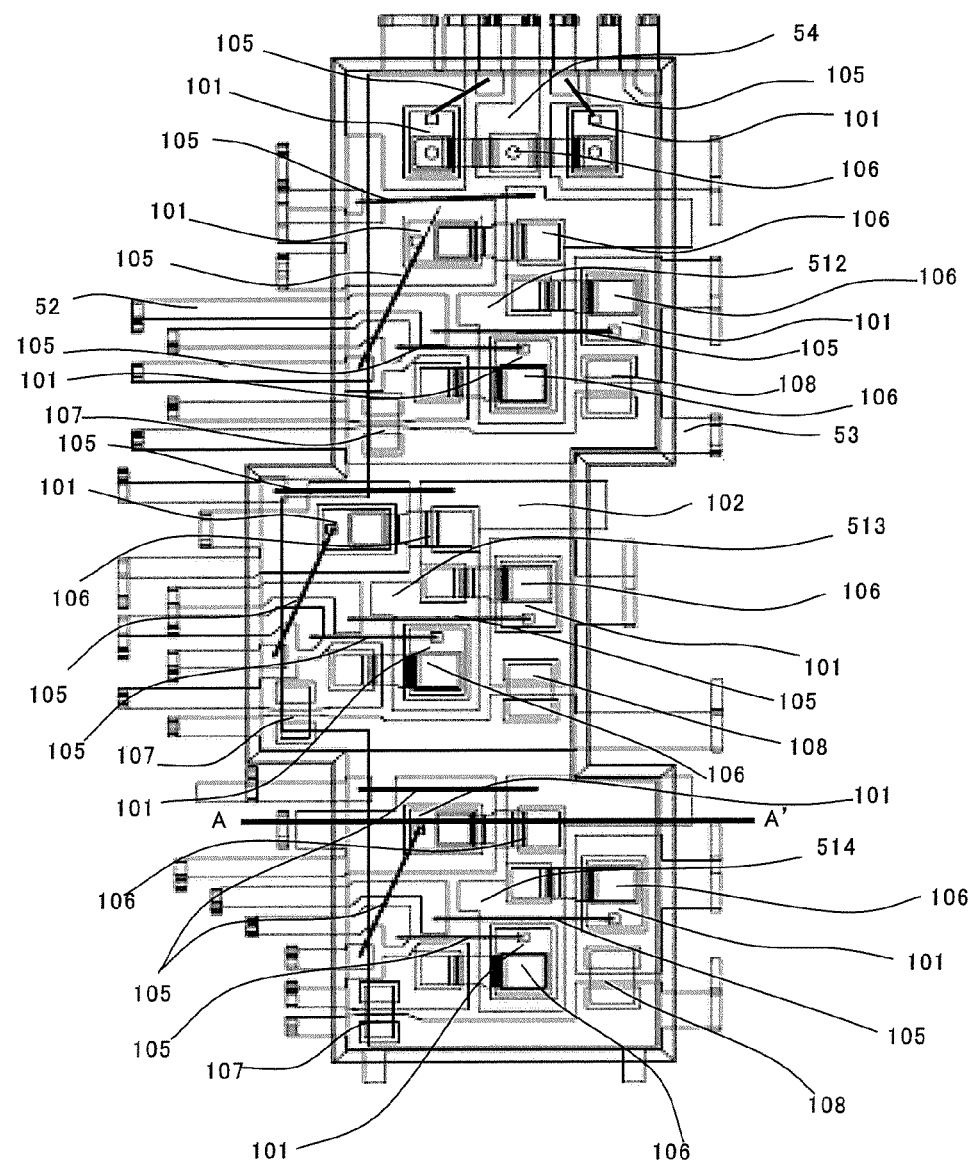
FIG. 7 is a plan view for illustrating a circuit structure (first) of the semiconductor device in the controller integrated with the rotary electric machine according to the first embodiment of the present invention.
Figure 8:
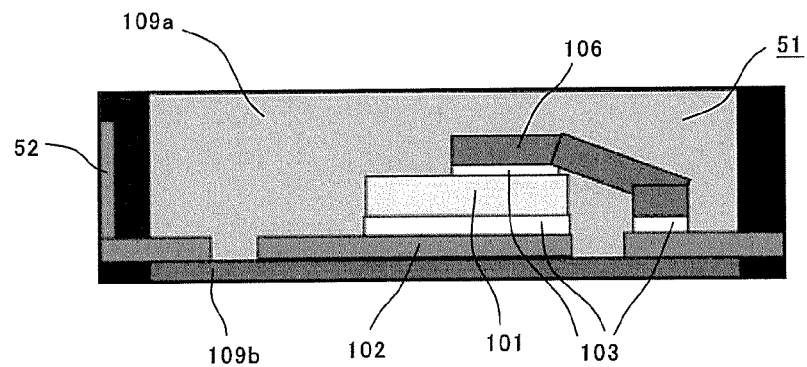
FIG. 8 is a sectional view for illustrating the semiconductor device of FIG. 7 taken along the line A-A'.

Next, in FIG. 7, illustration is given of an internal wiring structure of the semiconductor device 51 having different shapes excluding a mold resin on the mounting face side in FIG. 2. Moreover, in FIG. 8, illustration is given of a cross section of the semiconductor device 51 of FIG. 7 taken along the line A-A'.

This semiconductor device 51 includes a U-phase arm 512, a V-phase arm 513, and a W-phase arm 514, and each arm includes an upper arm and a lower arm. The upper arm is formed of one switching element, and the lower arm is formed of one switching element. The semiconductor device 51 includes, for example, semiconductor elements 101, a lead frame 102, a winding control terminal 52, a control terminal 53, wires 105, inner leads 106, capacitors 107, shunt resistors 108, and mold resins 109a and 109b (hereinafter collectively denoted by the reference symbol 109 in some parts).

In the example illustrated in FIG. 8, on a face of the lead frame 102 on an upper side (hereinafter referred to as "mounting face 102a"), for example, the semiconductor element 101 such as an IGBT, a MOSFET, an IC chip, or an LSI chip is mounted through intermediation of a joining member 103 such as a solder or silver. The lead frame 102 is a copper plate or a copper alloy plate, and a face thereof is coated with metal plating (not shown) such as gold, silver, nickel, or tin.

An electrode pad of the semiconductor element 101 is electrically connected to the winding control terminal 52 and the control terminal 53 through intermediation of a wire 105 connected by wire bonding or an inner lead 106 made of a material of the copper plate or a copper alloy plate to perform input and output of a signal with external components. The wires 105 and the inner leads 106 are replaceable with each other. The wires 105 are made of, for example, metal, silver, aluminum, or copper, and a wire diameter is from about 20 μm to about 500 μm.

Moreover, as the mold resin 109b on the heat rejection face side serving as the main face in contact with the heat sink 5 of the semiconductor device 51, a resin having a high thermal conductivity of from 3 W/m·K to 15 W/m·K is used in order to provide insulation between the semiconductor device 51 and the heat sink 5 and improve heat rejection to the heat sink 5.

Figure 9:
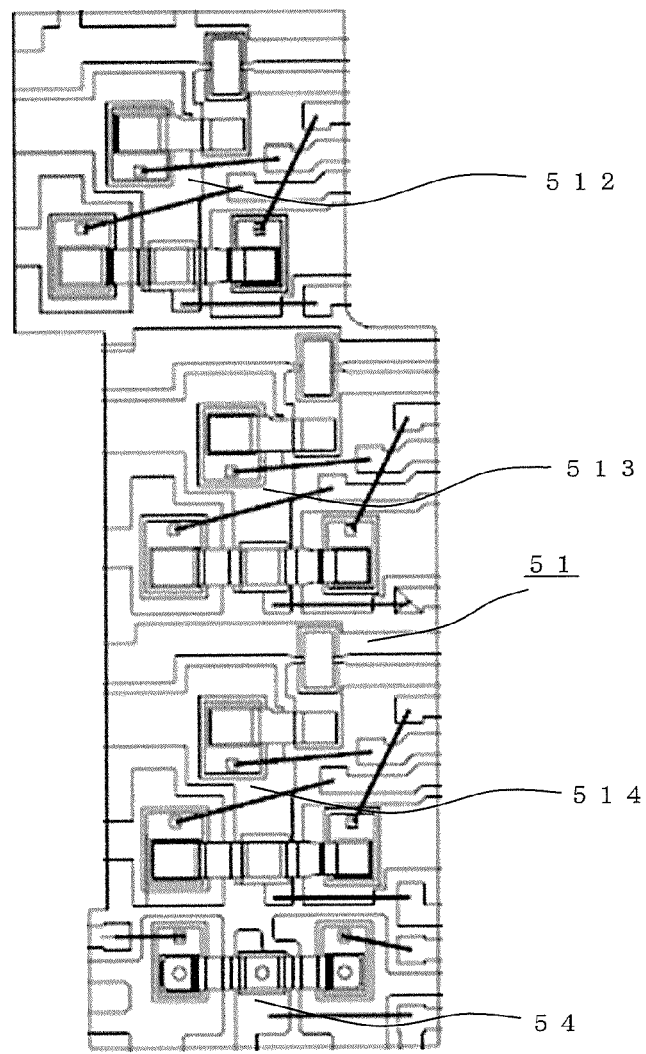
FIG. 9 is a plan view for illustrating a circuit structure (second) of the semiconductor device in the controller integrated with the rotary electric machine according to the first embodiment of the present invention.

Moreover, in FIG. 9, illustration is given of an internal wiring structure of the semiconductor device 51 having the different shapes excluding the mold resin 109a on the mounting face side, similarly with regard to FIG. 3. The U-phase arm 512, the V-phase arm 513, and the W-phase arm 514 of the inverter circuit 511 and the relay 54 are intensively provided in one semiconductor device 51, and each phase and the relay are offset in conformity with the outer shape of the heat sink 5 (herein a circular shape of a motor inverter). The length of the terminal may be set larger in accordance with the control board being a connection destination.

Figure 10:
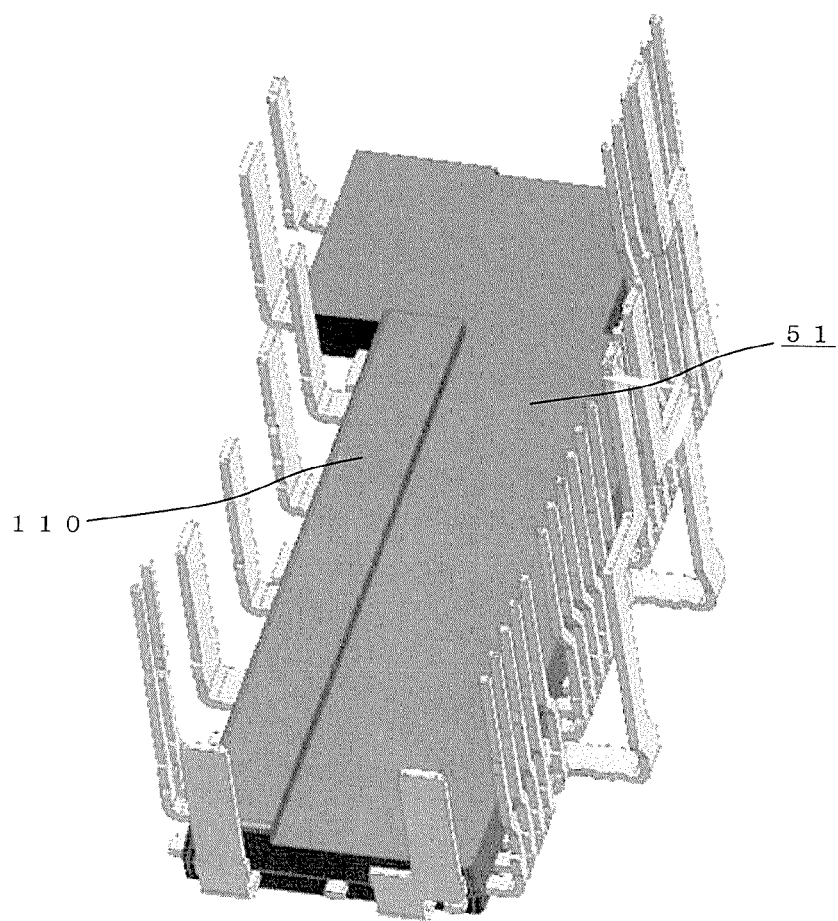
FIG. 10 is a perspective view for illustrating the semiconductor device in the controller integrated with the rotary electric machine according to the first embodiment of the present invention.

Next, in the description above, the semiconductor device 51 is formed and covered with the mold resin 109a so as to form a flat face in conformity with the largest component among mounted components. However, in the semiconductor device 51 illustrated in FIG. 10, depending on a layout of mounted components, a projecting portion 110 having a protruding shape is formed in conformity with heights of the semiconductor element 101 and the inner leads 106, the capacitors 107, and the shunt resistors 108 mounted on the semiconductor element 101.

Moreover, the mold resin 109 is manufactured by a step of injecting resin using a molding die. Thus, the shape thereof is not limited to the rectangular shape, and the mold resin 109 can also be manufactured even for the semiconductor devices 51 having main faces of different shapes as illustrated in FIG. 2 to FIG. 6. Moreover, with regard to the internal wiring layout of the lead frames and wires in the different shapes, the lead frames and wires are arranged in an offset arrangement in conformity with the outer shape of the heat sink 5 in unit of a circuit for each combination of the U-phase arm 512, the V-phase arm 513, the W-phase arm 514, and the relay 54. Thus, the lead frames and wires are not connected by wiring inside the module for each circuit. Thus, it is easy to employ the offset arrangement, and the circuit configuration is not complicated.

Moreover, in the examples of FIG. 4 and FIG. 5, the internal wiring is configured as illustrated in FIG. 7 or FIG. 9 in unit of a circuit for each of the U-phase, the V-phase, the W-phase, and the relay, and the length of the lead frame 102 is extended in conformity with the outer shape of the heat sink 5. Thus, the circuit configuration is not complicated.

Next, the rotary electric machine according to the first embodiment is described with reference to the circuit diagram of FIG. 11 in terms of an electric circuit.

Figure 11:
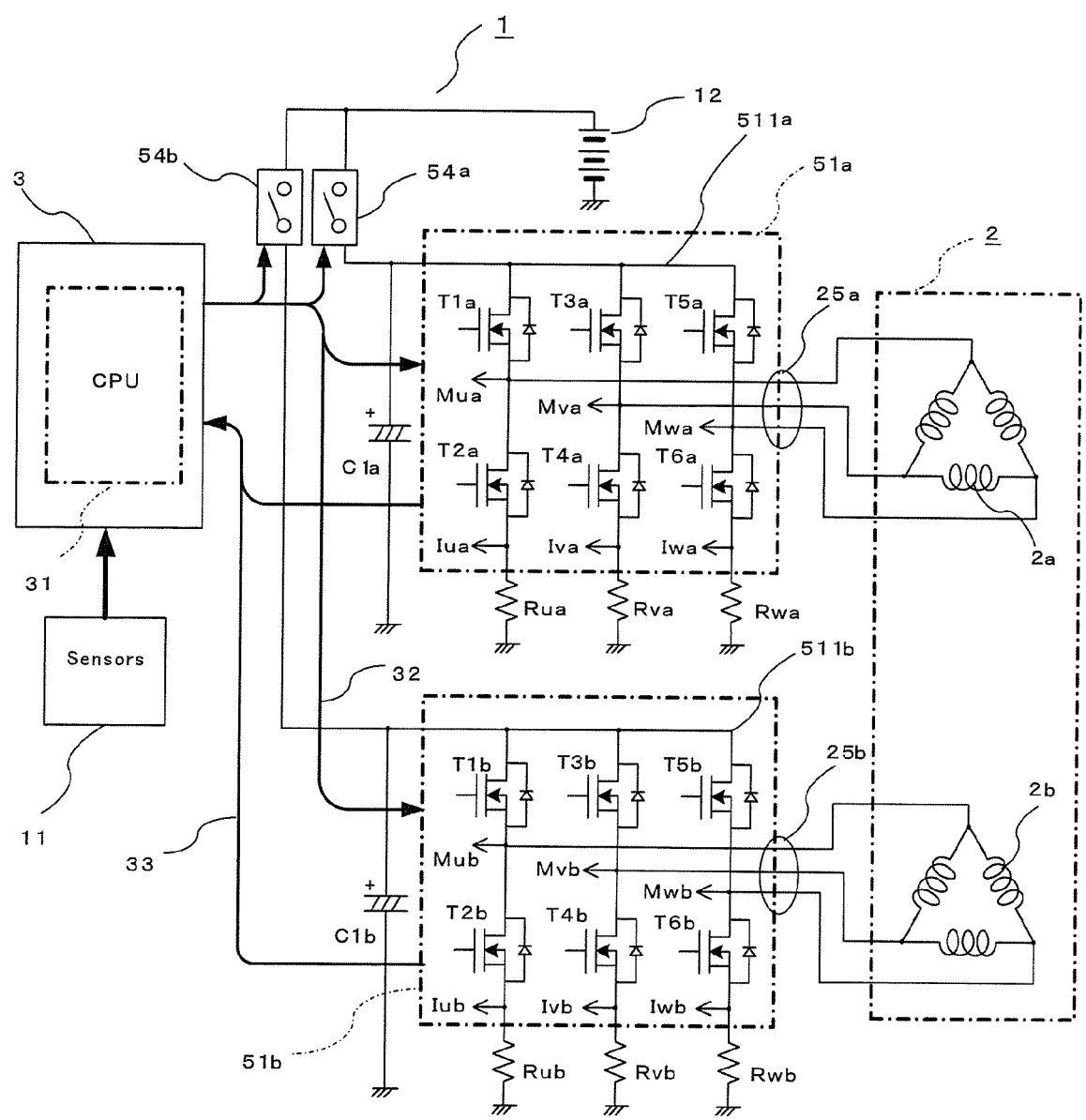
FIG. 11 is a diagram for illustrating an overall circuit configuration of the rotary electric machine according to the first embodiment of the present invention.

In FIG. 11, the rotary electric machine 1 according to the first embodiment includes the motor 2, a first inverter circuit 511a, a second inverter circuit 511b, the CPU 31, a battery 12, a first relay 54a, a second relay 54b, and sensors 11. The motor 2 is configured to generate a driving force for assisting a driver's steering effort. The first inverter circuit 511a serves as a first drive circuit. The second inverter circuit 511b serves as a second drive circuit. The CPU 31 is mounted to the control board 3. The battery 12 is mounted to a vehicle. The first relay 54a is configured to control supply of power from the battery 12 to the first inverter circuit 511a, and is formed of semiconductor elements. The second relay 54b is configured to control supply of power from the battery 12 to the second inverter circuit 511b, and is formed of semiconductor elements. The sensors 11 are configured to detect, for example, a steering torque of a driver and a vehicle speed. The first stator winding 2a and the second stator winding 2b described with reference to FIG. 1 include winding ends 25a and 25b, respectively.

The first inverter circuit 511a is provided in the first semiconductor device 51a, and includes six switching elements T1a, T2a, T3a, T4a, T5a, and T6a each formed of a semiconductor element, three shunt resistors Rua, Rva, and Rwa, and one smoothing capacitor C1a. Among the six switching elements T1a to T6a, the switching elements T1a, T3a, and T5a are inserted into a U-phase upper arm, a V-phase upper arm, and a W-phase upper arm of a three-phase bridge circuit, respectively. The switching elements T2a, T4a, and T6a are inserted into a U-phase lower arm, a V-phase lower arm, and a W-phase lower arm of the three-phase bridge circuit, respectively.

The shunt resistors Rua, Rva, and Rwa which are provided for detection of a motor current described later are connected between the switching elements T2a, T4a, and T6a and a ground level of a vehicle, respectively. The smoothing capacitor C1a connected between a common connection portion for the switching elements T1a, T3a, and T5a and the ground level of the vehicle is provided to smoothen the voltage of power supplied to the first inverter circuit 511a.

A U-phase alternating current terminal being a serial connection portion for the switching element T1a and the switching element T2a is connected to a U-phase terminal of the first stator winding 2a of the motor 2. A V-phase alternating current terminal being a serial connection portion for the switching element T3a and the switching element T4a is connected to a V-phase terminal of the first stator winding 2a. A W-phase alternating current terminal being a serial connection portion for the switching element T5a and the switching element T6a is connected to a W-phase terminal of the first stator winding 2a.

One ends of the upper arms of respective phases of the three-phase bridge circuit formed of the switching elements T1a, T3a, and T5a, respectively, are connected to each other in common to form a positive-polarity-side direct-current terminal of the first inverter circuit 511a, and are connected to a positive-polarity-side terminal of the battery 12 through intermediation of the first relay 54a. Meanwhile, one ends of the lower arms of respective phases of the three-phase bridge circuit formed of the switching elements T2a, T4a, and T6a, respectively, form a negative-polarity-side direct-current terminal of the first inverter circuit 511a, and are connected to the ground level of the vehicle through intermediation of the shunt resistors Rua, Rva, and Rwa, respectively.

The second inverter circuit 511b is provided in the second semiconductor device 51b, and includes six switching elements T1b, T2b, T3b, T4b, T5b, and T6b being power elements and each being formed of a semiconductor element, three shunt resistors Rub, Rvb, and Rwb, and one smoothing capacitor C1b. Among the six switching elements, the switching elements Tub, T3b, and T5b are inserted into a U-phase upper arm, a V-phase upper arm, and a W-phase upper arm of a three-phase bridge circuit, respectively. The switching elements T2b, T4b, and T6b are inserted into a U-phase lower arm, a V-phase lower arm, and a W-phase lower arm of the three-phase bridge circuit, respectively.

The shunt resistors Rub, Rvb, and Rwb which are provided for detection of a motor current are connected between the switching elements T2b, T4b, and T6b and a ground level of a vehicle, respectively. The smoothing capacitor C1b connected between a common connection portion for the switching elements T1b, T3b, and T5b and the ground level of the vehicle is provided to smoothen the voltage of power supplied to the second inverter circuit 511b.

A U-phase alternating current terminal being a serial connection portion for the switching element T1b and the switching element T2b is connected to a U-phase terminal of the second stator winding 2b of the motor 2. A V-phase alternating current terminal being a serial connection portion for the switching element T3b and the switching element T4b is connected to a V-phase terminal of the second stator winding 2b. A W-phase alternating current terminal being a serial connection portion for the switching element T5b and the switching element T6b is connected to a W-phase terminal of the second stator winding 2b.

One ends of the upper arms of respective phases of the three-phase bridge circuit formed of the switching elements T1b, T3b, and T5b, respectively, are connected to each other in common to form a positive-polarity-side direct-current terminal of the second inverter circuit 511b, and are connected to a positive-polarity-side terminal of the battery 12 through intermediation of the second relay 54b.

Meanwhile, one ends of the lower arms of respective phases of the three-phase bridge circuit formed of the switching elements T2b, T4b, and T6b, respectively, form a negative-polarity-side direct-current terminal of the second inverter circuit 511b, and are connected to the ground level of the vehicle through intermediation of the shunt resistors Rub, Rvb, and Rwb, respectively.

The CPU 31 mounted to the control board 3 calculates a control amount corresponding to a target current value for driving the motor 2 based on information from the sensors 11 mounted to the vehicle, and gives the calculated control amount to gates of the switching elements of the first inverter circuit 511a and the second inverter circuit 511b through a line 32, to thereby perform PWM control on those switching elements.

The motor 2 is driven by three-phase alternating-current power having been subjected to the PWM control by the first inverter circuit 511a and the second inverter circuit 511b, and generates a desired assist torque to apply the assist torque to a steering shaft (not shown) through intermediation of the gear part 8 described above. The target-current control amount having been calculated by the CPU 31 is allocated to the first inverter circuit 511a and the second inverter circuit 511b so that a current amount is allotted to each of the first stator winding 2a and the second stator winding 2b. The ratio of the allotted current amount can be suitably set.

A U-phase terminal voltage Mua, a V-phase terminal voltage Mva, and a W-phase terminal voltage Mwa of the first stator winding 2a which are extracted from the U-phase alternating current terminal, the V-phase alternating current terminal, and the W-phase alternating current terminal of the first inverter circuit 511a are input to the CPU 31 through a signal line 33. Moreover, a U-phase motor current Iua, a V-phase motor current Iva, and a W-phase motor current Iwa flowing through the first stator winding 2a which are extracted from connection portions between the shunt resistors Rua, Rva, and Rwa and the switching elements T2a, T4a, and T6a of the first inverter circuit 511a are input to the CPU 31 through the signal line 33.

Similarly, a U-phase terminal voltage Mub, a V-phase terminal voltage Mvb, and a W-phase terminal voltage Mwb of the second stator winding 2b which are extracted from the U-phase alternating current terminal, the V-phase alternating current terminal, and the W-phase alternating current terminal of the second inverter circuit 511b are input to the CPU 31 through the signal line 33. Moreover, a U-phase motor current Iub, a V-phase motor current Ivb, and a W-phase motor current Iwb flowing through the second stator winding 2b which are extracted from connection portions between the shunt resistors Rub, Rvb, and Rwb and the switching elements T2b, T4b, and T6b of the second inverter circuit 511b are input to the CPU 31 through the signal line 33.

In the rotary electric machine according to the first embodiment having the configuration described above, the current amounts of the first stator winding 2a and the second stator winding 2b are controlled based on output from the CPU 31, for example, based on the predetermined allotted amounts so that the desired assist torque is generated by the motor 2.

That is, the CPU 31 calculates the target-current control amount for the motor 2 based on the information such as the steering torque by a driver and the vehicle speed input from the sensors 11 as described above, and gives gate signals corresponding to the above-mentioned allotted amounts with respect to the calculated target-current control amount to the gates of the switching elements of the first inverter circuit 511a through the signal line 32, to thereby perform the PWM control on those switching elements.

Similarly, the CPU 31 gives gate signals corresponding to the above-mentioned allotted amounts with respect to the above-mentioned calculated target-current control amount to the gates of the switching elements of the second inverter circuit 511b through the signal line 32, to thereby perform the PWM control on those switching elements.

The motor 2 is driven by the first stator winding 2a, which is biased by the three-phase alternating-current power having been subjected to the PWM control by the first inverter circuit 511a, and the second stator winding 2b, which is biased by the three-phase alternating-current power having been subjected to the PWM control by the second inverter circuit 511b, to thereby generate the assist torque corresponding to the steering torque of a driver and the vehicle speed and apply the assist torque to the steering shaft (not shown).

The following operation can also be performed. That is, opening and closing of the first relay 54a and the second relay 54b (hereinafter collectively denoted by the reference symbol 54 in some parts) is controlled in accordance with a command from the CPU 31. Then, any one of the first inverter circuit 511a and the second inverter circuit 511b is selected to drive the motor 2, and the other system may be brought into an idle state.

Next, description is made of the switching elements in each of the first semiconductor device 51a and the second semiconductor device 51b.

Description has been made of the case in which the first semiconductor device 51a and the second semiconductor device 51b have the following configurations. The six switching elements T1a to T6a which are formed of semiconductor elements connected to the upper arms and the lower arms of respective phases connected to the winding ends 25a of the first stator winding 2a are provided in one package. The six switching elements T1b to T6b which are formed of semiconductor elements connected to the upper arms and the lower arms of respective phases connected to the winding ends 25b of the second stator winding 2b are provided in one package. The first semiconductor device 51a and the second semiconductor device 51b are formed of those packages, respectively. However, the circuits to be provided in the semiconductor device 51 may be in various modes as described below.

Figure 12A:
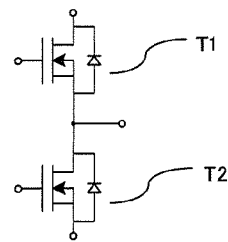
FIG. 12A is a diagram for illustrating a switching circuit example of the semiconductor device in the controller integrated with the rotary electric machine according to the first embodiment of the present invention.
Figure 12B:
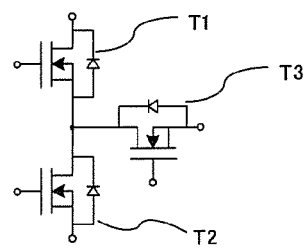
FIG. 12B is a diagram for illustrating a switching circuit example of the semiconductor device in the controller integrated with the rotary electric machine according to the first embodiment of the present invention.

FIG. 12A to FIG. 12D are each an illustration of examples of upper and lower arms of the semiconductor device in the rotary electric machine according to the first embodiment. FIG. 12A is an illustration of a case in which only two switching elements T1 and T2 formed of semiconductor elements of a pair of upper and lower arms for respective phases are provided in one semiconductor device. In FIG. 12B, three switching elements T1, T2, and T3 formed of semiconductor elements are provided to form one semiconductor device. The one switching element T3 is provided at a position between the winding ends 25a and 25b of the motor 2 and a connection point of the switching elements T1 and T2 of a pair of upper and lower arms. The switching element T3 is capable of performing on/off control on the connection between the winding ends 25a and 25b of the motor 2 and the switching elements T1 and T2 of the upper and lower arms, and serves as a motor relay.

Figure 12C:
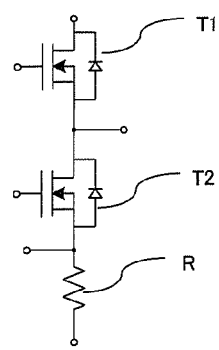
FIG. 12C is a diagram for illustrating a switching circuit example of the semiconductor device in the controller integrated with the rotary electric machine according to the first embodiment of the present invention.
Figure 12D:
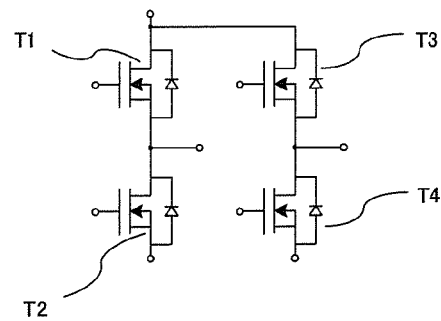
FIG. 12D is a diagram for illustrating a switching circuit example of the semiconductor device in the controller integrated with the rotary electric machine according to the first embodiment of the present invention.

In FIG. 12C, switching elements T1 and T2 formed of a pair of upper and lower semiconductor elements and a shunt resistor R for detection of a current are provided to form one semiconductor device. In FIG. 12D, switching elements T1 to T4 formed of two pairs of upper and lower semiconductor elements are provided to form one semiconductor device. The semiconductor device of the type illustrated in FIG. 12D is capable of forming, in particular, an H bridge, and is suitable for control of a brush motor.

As described above, when a plurality of switching elements are provided in consideration of, for example, a type and a function of a motor, various modes of the semiconductor device can be employed. The outlined circles in FIG. 12A to FIG. 12D represent terminals lead out from the semiconductor device.

Moreover, the relays may be intensively provided together with the switching elements to one semiconductor device. A plurality of semiconductor elements equivalent to those for a motor may be connected in parallel, or two chips may be mounted on the same board so that one component may be provided in outer appearance. As described above, the semiconductor device includes a plurality of semiconductor elements mounted thereto. Moreover, a semiconductor device including only an inverter circuit and a semiconductor device including only a relay can be separately provided. With such configuration, the arrangement of the semiconductor device illustrated in FIG. 6 is achieved.

Specifically, two semiconductor devices each including an inverter circuit having a combination of polygonal shapes extending along the outer edge portion of the controller while avoiding the output shaft 24 are provided, and one semiconductor device of a relay having a rectangular shape is provided. In FIG. 2 to FIG. 6 for illustrating arrangements of the semiconductor device, the winding control terminals 52 and the control terminals 53 are not illustrated, but are extended from the semiconductor device 51 in accordance with a circuit pattern of the control board 3 and arrangement of the winding ends.

As described above, with the configuration of the rotary electric machine according to this embodiment, integration with the controller provided within a diameter of the motor 2 can be achieved, thereby contributing to downsizing of the entirety of the rotary electric machine. Moreover, not limited to the insulating member having a rectangular shape, a semiconductor device having a different shape can be mounted. Thus, as compared to the related art, a larger heat rejection area can be secured, and a length of the control terminal can be freely determined, thereby contributing to improvement in heat rejection performance, downsizing, and high insulation performance.

Moreover, the projecting portion 110 having a partially protruding shape is formed in conformity with mounted components having a large height, thereby being capable of reducing a height in conformity with mounted components having a small height. Therefore, the amount of use of a mold resin can be reduced, and hence an effect of reducing a material cost can be attained.

Second Embodiment

In the above-mentioned first embodiment, description is made of the case in which the controller is mounted in the output direction of the motor, that is, on the front side of the motor. More in detail, description is made of the rotary electric machine in which the controller, the heat sink, and the gear part are sequentially arranged in the stated order in the axis direction of the motor on the front side of the motor, and are integrated with each other.

Meanwhile, in the rotary electric machine according to the second embodiment which is to be described below, a controller is mounted on a non-output side of the motor, that is, on a rear side of the motor. More in detail, the heat sink and the controller are sequentially arranged in the stated order in the axis direction of the motor on the rear side of the motor, and are integrally fixed. Further, the gear part is arranged in the axis direction of the motor on the front side of the motor, and is integrally fixed.

Figure 13:
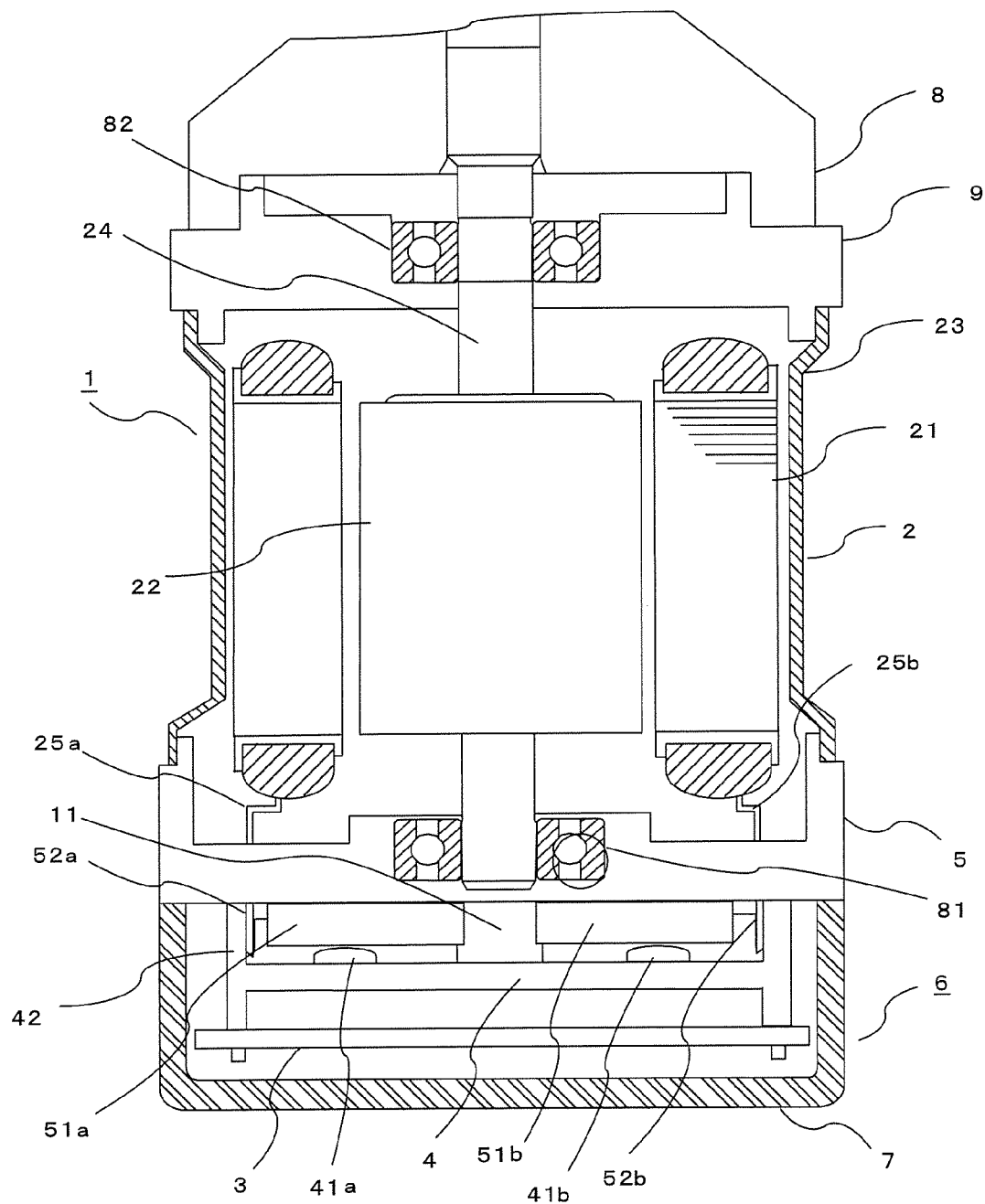
FIG. 13 is a partial sectional view for illustrating a rotary electric machine according to a second embodiment of the present invention.

FIG. 13 is a sectional view for illustrating the rotary electric machine according to the second embodiment. In FIG. 13, the controller 6 is mounted so as to be arranged in the axis direction of the motor 2 on the non-output side of the motor 2, that is, the rear side being a non-front side of the motor 2. More specifically, the rotary electric machine 1 includes the motor 2, the heat sink 5, the controller 6, and the gear part 8. The controller 6, the heat sink 5, the motor 2, and the gear part 8 are arranged in the stated order in the axis direction of the motor 2, and are integrated with each other.

In the controller 6, the first semiconductor device 51a and the second semiconductor device 51b, which are held in close contact with and fixed to a non-motor side end face of the heat sink 5 fixed on the rear side of the motor 2, the relay member 4, and the control board 3 are stacked in the stated order and assembled. Similarly to the above-mentioned first embodiment, the relay member 4 has the first projection portion 41a and the second projection portion 41b. The first semiconductor device 51a and the second semiconductor device 51b are pressed against the heat sink 5 by the first projection portion 41a and the second projection portion 41b. The winding control terminals 52a and 52b of the first semiconductor device 51a and the second semiconductor device 51b are connected to the winding ends 25a and 25b of the first stator winding 2a and the second stator winding 2b of the motor 2, which pass through the heat sink 5.

A front bracket 9 of the motor 2 has a structure which is capable of fixing a bearing 82 configured to support the output shaft 24 so as to be rotatable and is also capable of assembling the gear part 8 and the yoke 23 of the motor 2.

A significant difference from the above-mentioned first embodiment is as follows. That is, a direction of leading out the winding ends 25a and 25b of the first stator winding 2a and the second stator winding 2b of the motor 2 is different from that of the case of the first embodiment, and hence a mode of connecting the semiconductor devices 51a and 51b being first and second power modules, the relay member 4, and the winding ends 25a and 25b is different.

Specifically, in the first embodiment, the winding ends 25a and 25b of the motor 2 are connected to the winding control terminals 52a and 52b of the first semiconductor device 51a and the second semiconductor device 51b through the control board 3 and the relay member 4, or are connected to the winding control terminals 52a and 52b of the first semiconductor device 51a and the second semiconductor device 51b through conductors in the relay member 4.

In contrast, in the configuration of the second embodiment, the winding ends 25a and 25b of the motor 2 can be directly connected to the winding control terminals 52a and 52b of the first semiconductor device 51a and the second semiconductor device 51b.

In the second embodiment, it is required that penetrating holes be formed in the heat sink 5 and that the winding ends 25a and 25b pass through the penetrating holes. The penetrating holes of the heat sink 5 serve as a guide for the winding ends 25a and 25b. Thus, the insulation performance with respect to the heat sink 5 can be secured by interposing a non-conductive bush between each of the through holes and the windings, and such configuration may serve as a countermeae for vibration of the windings.

The heat sink 5 is held in abutment against the yoke 23 of the motor 2, and hence heat of the heat sink 5 is transferred also to the yoke 23. In contrast, when generation of heat is larger in the motor 2, heat of the motor 2 side can be transferred to the heat sink 5.

Similarly to the above-mentioned first embodiment, the winding ends 25a and 25b of the first stator winding 2a and the second stator winding 2b may penetrate through the heat sink 5, pass in the vicinity of the first semiconductor device 51a and the second semiconductor device 51b, and be connected to the winding control terminals 52a and 52b of the first semiconductor device 51a and the second semiconductor device 51b through use of the relay member 4.

As described above, with the rotary electric machine according to the second embodiment, the controller is arranged on the rear side of the motor through use of the component configuration similar to that of the case of the first embodiment in which the controller is arranged on the front side of the motor, thereby being capable of enabling designing with the same basic structure as the case of the first embodiment, and attaining the effect that some components can be used in common. Further, there is no need to form a hole for allowing the output shaft of the motor to penetrate therethrough in the heat sink, the relay member, and the control board, and hence the effect of enabling arrangement of the electric components in an open space can be attained.

Figure 14:
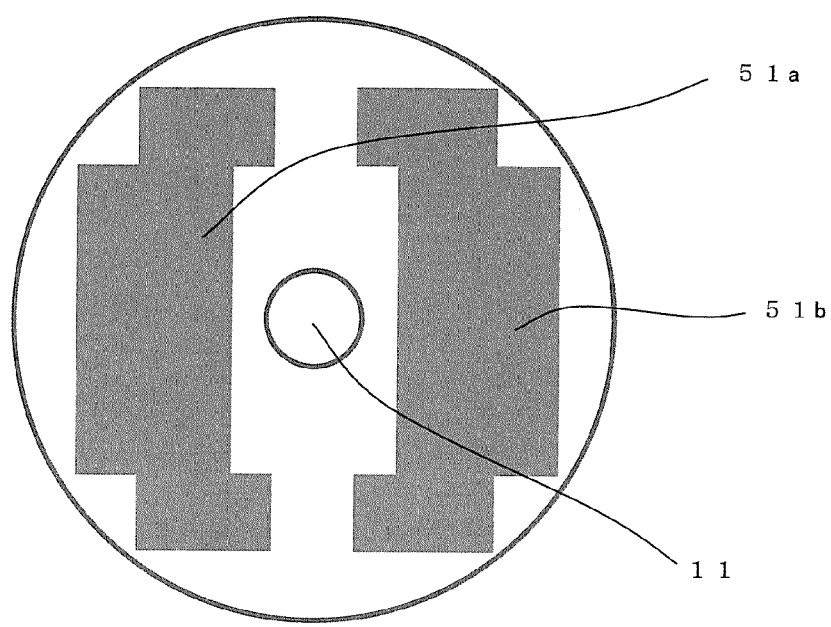
FIG. 14 is a plan view for illustrating an arrangement example of the semiconductor device in the controller integrated with the rotary electric machine according to the second embodiment of the present invention.

Moreover, even in a case in which the sensors 11 such as a rotary sensor are mounted so as to penetrate through the control board to reduce the shaft length, similarly to the first embodiment, the semiconductor device can be arranged in a mode of avoiding the sensors 11 as illustrated in FIG. 14. Moreover, the arrangement similar to those of the first embodiment illustrated in FIG. 2 to FIG. 6 can be achieved, thereby being capable of contributing to downsizing.

Third Embodiment

In the above-mentioned first and second embodiments, there is provided the controller which includes the two-layer three-phase motor including the two stator windings and a plurality of drive circuits configured to individually drive the two stator windings, and corresponding semiconductor devices are mounted. However, there may be provided a controller which includes a multi-layer multi-phase motor including three or more stator windings and three or more drive circuits configured to individually drive three or more stator windings, and corresponding semiconductor devices may be mounted. In this case, there are provided three or more inverter circuits, three or more relays, three or more stator windings, and three or more winding ends, and the same effect can be attained even when the configuration is changed so that the motor is driven by one control system.

Alternatively, there may be provided a motor including one stator winding and a controller including one drive circuit configured to individually drive the one stator winding, and a corresponding semiconductor device may be mounted. In this case, there are provided one inverter circuit, one relay, one stator winding, and one winding end, and the same effect can be attained even when the configuration is changed so that the motor is driven by one control system.

In this case, the left and right semiconductor devices 51a and 51b illustrated in FIG. 2 to FIG. 5, that is, the drive circuits 511a and 511b are joined together and formed into one module, or the semiconductor devices 51a and 51b are formed into one module without being joined together.

In the above-mentioned first to third embodiments, description is made of examples of preferred embodiments, and the embodiments may be suitably combined, modified, omitted, or changed within a range not departing from the gist of the invention. The stator windings 2a and 2b, the winding end 25, the sensors 11, the projection portion 41, the semiconductor device 51, the semiconductor element 101, the joining member 103, the winding control terminal 52, the control terminal (connection terminal) 53, the wire 105, the inner lead 106, the capacitor 107, and the shunt resistor 108 are illustrated in plural or singular in the drawings. However, as a matter of course, the number of the components is not limited, and may suitably be selected in accordance with a demanded function.

REFERENCE SIGNS LIST 1 rotary electric machine, 2 motor, 2a, 2b stator winding, 3 control board, 4 relay member, 5 heat sink, 6 controller, 7 housing, 8 gear part, 9 front bracket, 11 sensors, 12 battery, 21 stator, 22 rotor, 23 yoke, 24 output shaft, 25a, 25b winding end, 31 CPU, 41, 41a, 41b projection portion, 42, 42a, 42b frame, 51, 51a, 51b semiconductor device, 54 relay, 52, 52a, 52b, 53, 53a, 53b control terminal (connection terminal), 81, 82 bearing, 101 semiconductor element, 102 lead frame, 103 joining member, 105 wire, 106 inner lead, 107 capacitor, 108 shunt resistor, 109a, 109b mold resin, 110 projecting portion, 512 U-phase arm, 513 V-phase arm, 514 W-phase arm, T1a to T6a, T1b to T6b, T1 to T4 switching element, Rua, Rva, Rwa, Rub, Rvb, Rwb, R shunt resistor, C1a, C1b smoothing capacitor

The invention claimed is:

1. A rotary electric machine, comprising:
a controller; and
a heat sink, the controller and the heat sink being arranged in an extending direction of an output shaft of a motor,
wherein the controller includes a semiconductor device which extends away from the output shaft in a first direction of the output shaft that is perpendicular to the extending direction and comprises:
a main face maintained in close contact with the heat sink,
a back face opposing the main face,
an outer edge portion having a first side face which connects the main face and the back face,
an inner edge portion which opposes the outer edge portion and extends facing the output shaft in a second direction of the output shaft that is perpendicular to the first direction, the inner edge portion having a second side face which connects the main face and the back face and extends facing the output shaft in parallel to a plane extending through a center axis of the output shaft in the second direction, and
a drive circuit provided for a winding set of a stator of the motor at the main face and formed so as to extend along an outer edge portion of the heat sink that corresponds to the outer edge portion of the semiconductor device, to increase a cooling area.

2. The rotary electric machine according to claim 1, wherein the drive circuit is formed so as to include at least one group of circuit portions having the same shape or different shapes.

3. The rotary electric machine according to claim 2, wherein the same shape or the different shapes comprises a rectangular shape, a polygonal shape, or a curved shape.

4. The rotary electric machine according to claim 3, wherein the controller further includes:
a control board;
a relay member having the control board mounted thereto; and
a projection portion, which is made of a mold resin, and is provided between the relay member and the semiconductor device so that the semiconductor device is held in close contact with the heat sink by the relay member.

5. The rotary electric machine according to claim 2, wherein the controller further includes:
a control board;
a relay member having the control board mounted thereto; and
a projection portion, which is made of a mold resin, and is provided between the relay member and the semiconductor device so that the semiconductor device is held in close contact with the heat sink by the relay member.

6. The rotary electric machine according to claim 1, wherein the motor, the controller, and the heat sink are sequentially arranged, and the heat sink is connected to a gear part.

7. The rotary electric machine according to claim 6, wherein the controller further includes:
a control board;
a relay member having the control board mounted thereto; and
a projection portion, which is made of a mold resin, and is provided between the relay member and the semiconductor device so that the semiconductor device is held in close contact with the heat sink by the relay member.

8. The rotary electric machine according to claim 1, wherein the controller, the heat sink, and the motor are sequentially arranged, and the motor is connected to a gear part through intermediation of a front bracket.

9. The rotary electric machine according to claim 8, wherein the controller further includes:
   a control board;
   a relay member having the control board mounted thereto; and
   a projection portion, which is made of a mold resin, and is provided between the relay member and the semiconductor device so that the semiconductor device is held in close contact with the heat sink by the relay member.

10. The rotary electric machine according to claim 8, wherein, when the semiconductor device comprises a plurality of semiconductor devices, a flat face space is defined between the plurality of semiconductor devices so as to allow an electric component to be arranged therein.

11. The rotary electric machine according to claim 8, further comprising a sensor arranged at a center of the heat sink.

12. The rotary electric machine according to claim 1, wherein the controller further includes:
   a control board;
   a relay member having the control board mounted thereto; and
   a projection portion, which is made of a mold resin, and is provided between the relay member and the semiconductor device so that the semiconductor device is held in close contact with the heat sink by the relay member.

13. The rotary electric machine according to claim 1, wherein the inner edge portion comprises a protruding portion extending toward the output shaft in parallel to the second direction.

* * * * *